(12) United States Patent
Takeda et al.

(10) Patent No.: US 6,614,745 B1
(45) Date of Patent: Sep. 2, 2003

(54) RECORDING APPARATUS AND RECORDING MEDIUM

(75) Inventors: Toru Takeda, Saitama (JP); Satoshi Kumai, Kanagawa (JP); Ayumi Konishi, Miyagi (JP); Junichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 09/666,646

(22) Filed: Sep. 20, 2000

(30) Foreign Application Priority Data

Sep. 21, 1999 (JP) .......................................... P11-267382

(51) Int. Cl.[7] ................................................. G11B 7/00
(52) U.S. Cl. ............................. 369/124.13; 369/124.15; 369/47.27; 369/44.13
(58) Field of Search ...................... 369/275.3, 44.13, 369/47.28, 53.25, 275.4, 47.38, 47.27, 47.36, 53.3, 124.01, 124.07, 124.13, 124.15

(56) References Cited

U.S. PATENT DOCUMENTS

| | | | | |
|---|---|---|---|---|
| 5,210,738 A | * | 5/1993 | Iwata et al. ............... | 369/44.13 |
| 5,434,834 A | | 7/1995 | Shinoda et al. | |
| 5,615,185 A | | 3/1997 | Horikiri | |
| 5,852,599 A | * | 12/1998 | Fuji ......................... | 369/44.13 |
| 5,978,333 A | | 11/1999 | Kobayashi et al. ....... | 369/44.41 |
| 6,018,507 A | | 1/2000 | Takeda et al. ............. | 369/111 |
| 6,069,870 A | * | 5/2000 | Maeda et al. ............. | 369/44.13 |
| 6,081,490 A | | 6/2000 | Kuroda et al. | |

FOREIGN PATENT DOCUMENTS

| | | |
|---|---|---|
| EP | 786 767 | 7/1997 |
| EP | 0 893 793 | 1/1999 |
| EP | 0 997 893 | 5/2000 |
| WO | WO 98/35347 | 8/1998 |

OTHER PUBLICATIONS

Patent Abstracts of Japan, JP 10 293926, Nov. 4, 1998 (with corr. US 6,081,490).

* cited by examiner

*Primary Examiner*—Nabil Hindi
(74) *Attorney, Agent, or Firm*—Oblon, Spivak, McClelland, Maier & Neustadt, P.C.

(57) ABSTRACT

There are provided a spindle motor 12, an optical head 20, a high-pass filter 31, low-pass filters 32 and 33, an adder 38, and a PLL 39. The spindle motor 12 rotatively drives an optical disk 11. The optical head 20 irradiates a laser beam onto a target track and both tracks adjacent to the target track on the optical disk 11 and detects a return light from each track. The high-pass filter 31 filters a high-frequency component in a signal used for detecting a return light from a target track in the optical head 20. Each of the low-pass filters 32 and 33 filters a low-frequency component in a signal used for detecting a return light from each of the adjacent tracks. The adder 38 operates output signals from the high-pass filter 31, and the low-pass filters 32 and 33. Based on a signal from the adder 38, the PLL 39 generates a reference signal used as a time reference for generating recording signals. An operation by the adder 38 nullifies a cross modulation component.

8 Claims, 5 Drawing Sheets

RECORDING APPARATUS AND RECORDING MEDIUM

BACKGROUND OF THE INVENTION

1. Technical Field of the Invention

The present invention relates to a recording apparatus for recording information signals on a recording medium and to a recording medium on which information signals are recorded.

2. Prior Art

Conventionally, there is provided an optical disk having a wobble for a boundary between a land and a groove formed as a recording track on a signal recording surface. There is also provided a recording apparatus in compliance with such an optical disk.

The recording apparatus tracks a recording optical beam along a slightly wobbling groove on the optical disk such as a music MD or a CD-R disk for computers.

In addition, the recording apparatus uses a frequency filter to electrically separate a wobbling frequency component from a tracking guidance signal. The recording apparatus gradually multiplies this wobbling frequency component to use it as a synchronization clock for recording data.

When there are two disk formats with different wobbling frequencies, it is necessary to provide a separate disk specific to each wobbling frequency. There has been a need to manufacture two types of blank disks for marketing. This is also inconvenient for users. A recording apparatus compatible with each disk type is also required.

BRIEF SUMMARY OF THE INVENTION

The present invention has been made in consideration of the foregoing. It is therefore an object of the present invention to provide a recording medium available for an apparatus which complies with two disk formats having different wobbling frequencies. It is also an object of the present invention to provide a recording apparatus which records data with high quality on such a recording medium.

For solving the above-mentioned problems, a recording apparatus according to the present invention forms a land and a groove as a recording track on a signal recording surface of a disk-shaped recording medium. Data is recorded on a disk-shaped recording medium provided with a wobble between the land and the groove. The wobble has a waveform which is a combination of waveforms with first and second frequencies. The second frequency is lower than the first frequency.

The recording apparatus comprises: drive means for rotatively driving the recording medium; light irradiation means for condensing a laser beam and irradiating it onto a target track and both tracks adjacent thereto on a signal recording surface of the recording medium which is rotatively driven by the drive means; light detection means for detecting a return light from each of the target track and both tracks adjacent thereto and converting the return light into an electric signal; high-pass filtering means for filtering a high-frequency component in a signal corresponding to the return light which is returned from the target track and is output from the light detection means; low-pass filtering means for filtering a low-frequency component in a signal corresponding to the return light which is returned from each of both tracks adjacent to the target track and is output from the light detection means; arithmetic means for computing a signal which passed the high-pass filtering means and a signal which passed the low-pass filtering means; and means for generating a reference signal based on a phase of the signal computed in the arithmetic means. The arithmetic means nullifies a nonlinear component due to wobbling of both tracks adjacent to the target track and extracts only a waveform component from the first frequency.

There are formed a land and a groove as a recording track on a signal recording surface of a recording medium according to the present invention. The disk-shaped recording medium is provided with a wobble between the land and the groove. The wobble has a waveform which is a combination of waveforms with first and second frequencies. The second frequency differs from the first frequency.

A wobble is formed on a recording track of the recording medium according to the present invention so that the first frequency and the second frequency waveforms are superposed on each other. It is impossible to use a recording apparatus which is compatible with the first frequency or the second frequency.

The recording apparatus using a first high-pass frequency wobble separates a wobbling frequency component in the wobble from a tracking error signal. The recording apparatus then suppresses a wobbling frequency component of the second low-pass frequency to generate a high-quality recording synchronization clock. This provides recording quality equivalent to that available with a single frequency wobble.

As mentioned above, the present invention extracts a high-pass component from the wobble which is formed on the recording medium's recording track and comprises the superposed frequencies with high-pass and low-pass components. The present invention nullifies a nonlinear component, especially a cross modulation component from the adjacent wobble. Namely, the present invention removes not only low-pass components mixedly reproduced from the target track due to wobbling, but also cross modulations which are not removed by a filter and are caused by adjacent track's wobbling.

According to the present invention, a reference signal used as a time reference for recording data is a pure high-pass component in the target track wobble. As a result, an optical disk records a series of high-quality data with little fluctuation in a time axis.

DETAILED DESCRIPTION OF THE INVENTION

Embodiments of the present invention will be described in detail, with reference to the accompanying drawings.

Figure 1:
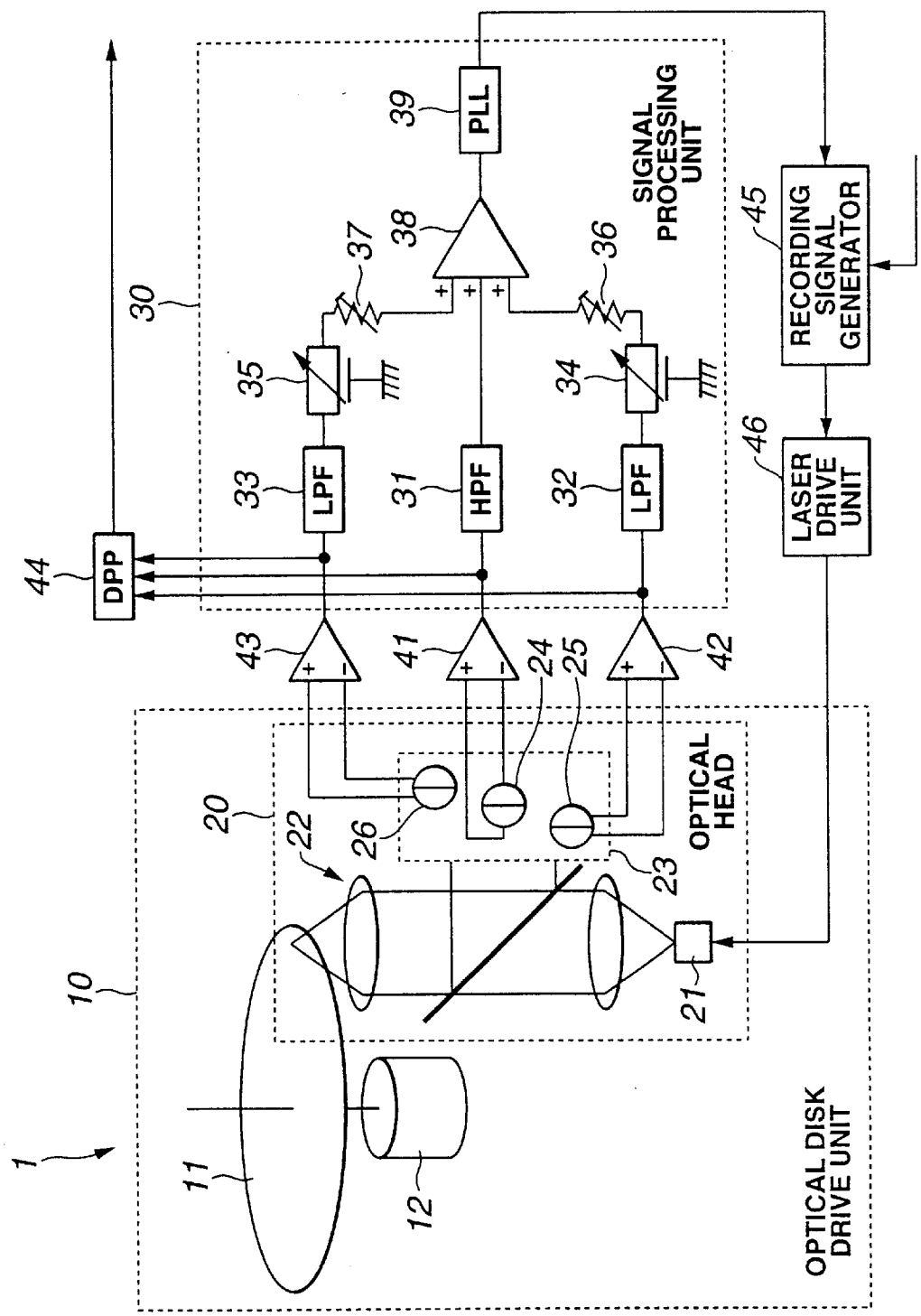
FIG. 1 is a block diagram showing a schematic configuration of a recording apparatus.

First, the following describes a recording apparatus for recording data on an optical disk with reference to FIG. 1.

The recording apparatus 1 includes an optical disk drive unit 10 comprising a spindle motor 12 and an optical head 20. The spindle motor 12 rotatively drives an optical disk 11. The optical head 20 records information by irradiating laser onto the optical disk.

Figure 2:
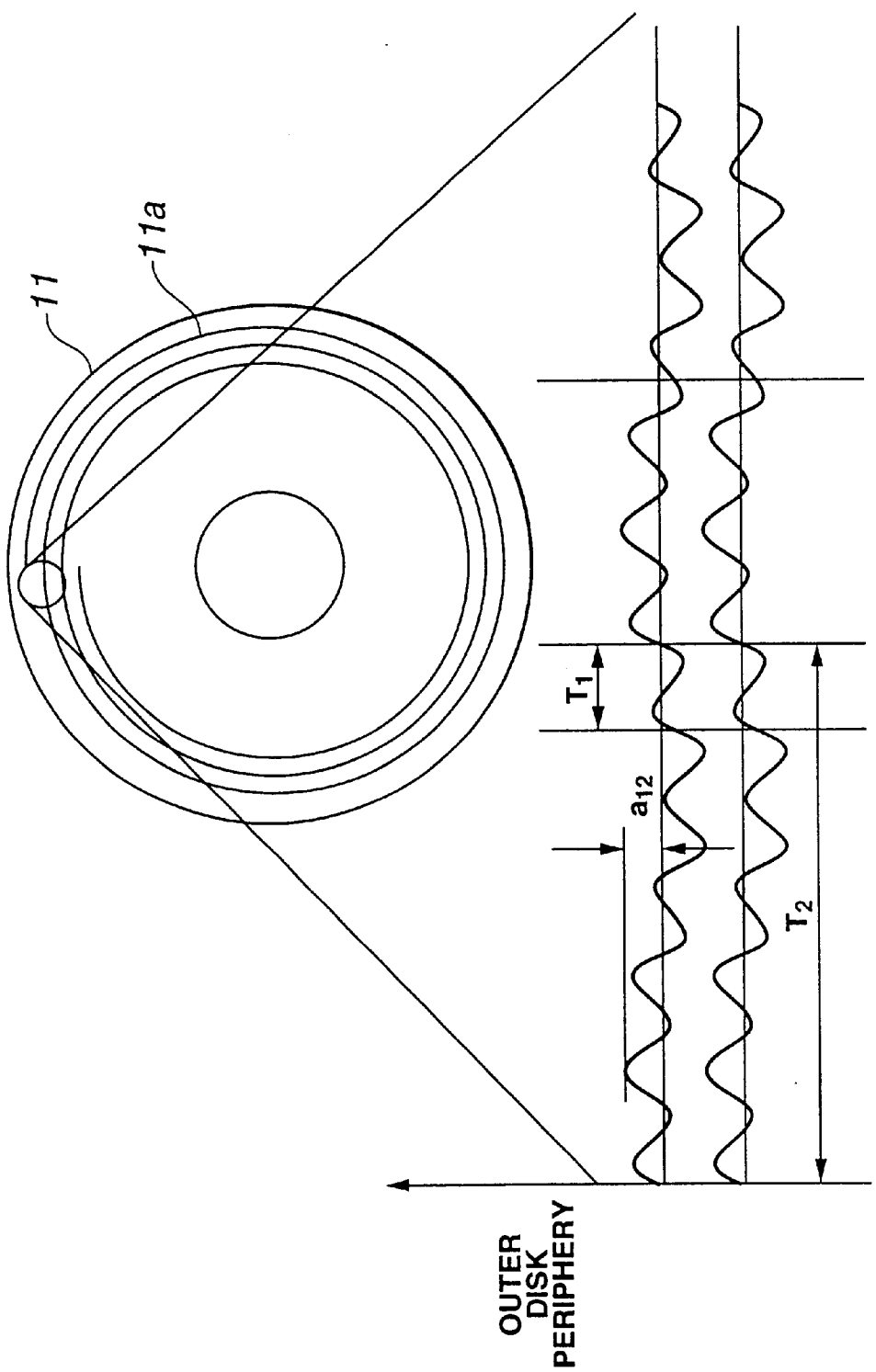
FIG. 2 illustrates a wobble formed on an optical disk.

As shown in FIG. 2, with respect to the optical disk 11 according to this embodiment, spiral lands and grooves form a recording track 11a on a signal recording surface where an information signal is recorded. This embodiment assumes the use of a phase-change disk which records an information signal on the signal recording surface based on a phase change.

The optical disk 11 has a radius of 24.00 mm for an innermost track and a radius of 60.00 mm for an outer disk periphery. A track pitch of 0.74 μm is used for a recording track 11a on the signal recording surface.

Part of the enlarged optical disk 11 is shown below the disk in FIG. 2. According to this embodiment, the spindle motor 12 drives the optical disk 11 at a constant linear velocity (CLV). A wobble is formed between a groove and a land on the recording track. The wobble is a combination of a first wavelength corresponding to a high-pass first frequency and a second wavelength corresponding to a low-pass second frequency based on a wavelength for the channel clock.

The wavelength for the channel clock is specified as follows.

T=0.133 μm

The first wavelength is specified as follows.

$T_1$=31T=4.12 μm

The second wavelength is specified as follows.

$T_2$=186T=24.74 μm

The wobble has the following amplitude.

$a_{12}$=30 nm (0-p)

The above notation 0-p means an amplitude from 0 to the peak.

Figure 3A:
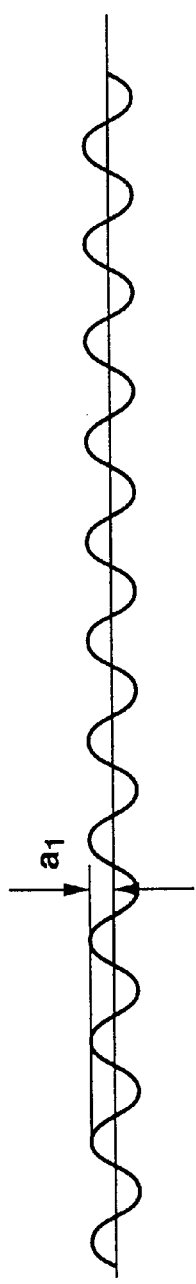
FIGS. 3A and 3B show waveforms.
Figure 3B:
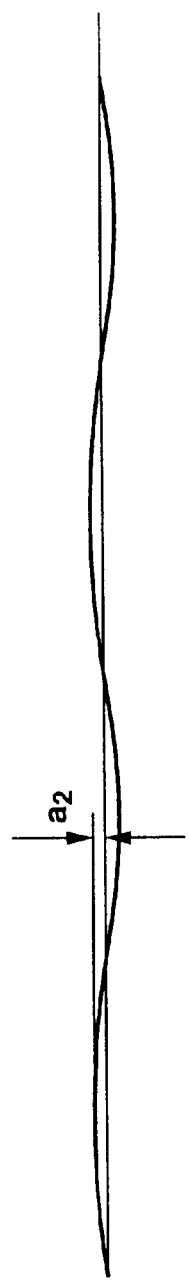

A wobble waveform is an overlap of a waveform having a first wavelength $T_1$ with a first amplitude as shown in FIG. 3A and a second wavelength $T_2$ with a second amplitude as shown in FIG. 3B.

The first amplitude is specified as:

$a_1$=20 nm (0-p)

The second amplitude is specified as:

$a_2$=10 nm (0-p).

The following wobble amplitude is obtained by superimposing the first amplitude $a_1$ and the second amplitude $a_2$.

$a_{12}$=30 nm (0-p)

A groove in the optical disk 11 has a track pitch of 740 nm. A wobble amplitude (60 nm peak-to-peak) is approximately 10% of the track pitch. Namely, the aspect ratio is not 1:1 in FIGS. 2 and 3. The same applies to FIG. 4 described later.

On the optical disk 11, the wobble is formed to a waveform having the first frequency and the second frequency superimposed to each other. Accordingly, the optical disk 11 is compatible with both a recording apparatus compliant with the first frequency and a recording apparatus compliant with the second frequency.

The recording apparatus according to this embodiment extracts a signal with the first wavelength $T_1$ corresponding to a high-pass waveform for generating a reference signal (clock). This reference signal works as a time reference for recording data. Based on the reference signal, recorded data is used for modulating intensity of a laser beam irradiated from the optical head 20. By doing this, it is possible to record a series of data accurately synchronized with the target track's wobble on the signal recording surface of the optical disk 11.

Controlled by a spindle servomechanism (not shown), the spindle motor 12 rotatively drives so that the optical disk 11 maintains a constant linear speed against a spot of a laser beam irradiated from the optical head 20 onto a target track.

The optical head 20 comprises a laser generator 21 for generating a laser beam, an optical unit 22 for guiding a light from the laser generator 21, and an optical detector 23 for detecting a light from the optical unit 22.

For example, a semiconductor laser can be used for the laser generator 21 generating a laser beam whose intensity is modulated by recorded data.

The optical unit 22 comprises a collimator lens, a beam splitter, an objective lens, a diffraction grating, and the like. When the laser generator 21 generates a laser beam, the optical unit 22 irradiates this laser beam as a spot onto a target track on the optical disk 11. To be precise, a spot is also formed on an adjacent track. This is described later.

The optical unit 22 transmits a return light from the target track on the optical disk 11 to the optical detector 23. It should be noted that some optical components in the optical unit 22 are omitted from the figure for simplicity.

The optical detector 23 detects a return light from the optical disk via the optical unit 22. The optical detector 23 according to this embodiment uses the 3-beam method. According to this method, a diffraction grating in the optical unit 22 diffracts the light to generate a zero order light as a main beam and ±first order lights as sub-beams.

In the optical detector 23, a first optical detector 24 at the center detects the zero order light. On both sides of the first optical detector 24, there are provided a second optical detector 25 and a third optical detector 26 which detect, say, ±first order lights, respectively.

Specifically, the main beam is used for detecting a reproduction signal and a focusing error signal. A side beam is used for detecting a tracking error signal. According to this embodiment, the side beam is used for nullifying a cross talk due to a wobble on an adjacent track.

For example, the main beam corresponds to a spot on the groove. Two side beams correspond to spots on both lands adjacent to a target track, respectively.

The optical unit 22 irradiates a laser beam onto the optical disk 11. Based on a tracking error signal and a focus error signal, the laser beam is controlled by a tracking servo unit and a focus servo unit (not shown). Namely, the tracking servo unit and the focus servo unit provides control so that a laser beam spot is positioned to the target track on the signal recording surface of the optical disk 11.

As mentioned above, the optical disk 11's recording track is provided with a wobble along a boundary between the land and the groove. The side beam is also used for detecting this wobble.

Further, the recording apparatus 1 comprises a first amplifier 41 for amplifying an output signal difference from the first optical detector 24, a second amplifier 42 for amplifying an output signal difference from the second optical detector 25, and a third amplifier 43 for amplifying an output signal difference from the third optical detector 26.

Each of the first optical detector 24, the second optical detector 25, and the third optical detector 26 comprises a photodiode which is divided into two portions. The first amplifier 41, the second amplifier 42, and the third amplifier 43 receive an output difference signal (push-pull signal) from the first optical detector 24, the second optical detector 25, and the third optical detector 26, respectively. The push-pull signal is used for detecting displacement of a beam transmitted to each detector.

A push-pull signal output from the first amplifier 41 corresponds to a push-pull signal for the target track. By contrast, push-pull signals output from the second amplifier 42 and the third amplifier 43 correspond to push-pull signals for both tracks adjacent to the target track.

In addition, the recording apparatus 1 includes a differential push pull (DPP) unit 44 which generates a tracking servo signal based on an output signal from the first amplifier 41, the second amplifier 42, and the third amplifier 43.

As described in the U. S. Pat. No. 4,775,968 (Ohsato), the differential push pull (DPP) unit 44 can provide a tracking error signal free from an offset due to displacement of the beam spot position detected by each optical detector in the optical detector 23. This tracking error signal is used for the tracking servo unit (not shown) to control an optical head position.

The recording apparatus 1 includes a signal processing unit 30 which generates a reference signal (clock) for recording an information signal based on output signals from the first amplifier 41, the second amplifier 42, and the third amplifier 43.

The signal processing unit 30 comprises a high-pass filter (HPF) 31, a first low-pass filter (LPF) 32, and a second low-pass filter (LPF) 33. The high-pass filter 31 filters a high-frequency component in the output signal from the first amplifier 41. The first low-pass filter 32 filters a low-frequency component in the output signal from the first low-pass filter 42. The second low-pass filter 33 filters a low-frequency component in the output signal from the third low-pass filter 43.

Figure 4A:
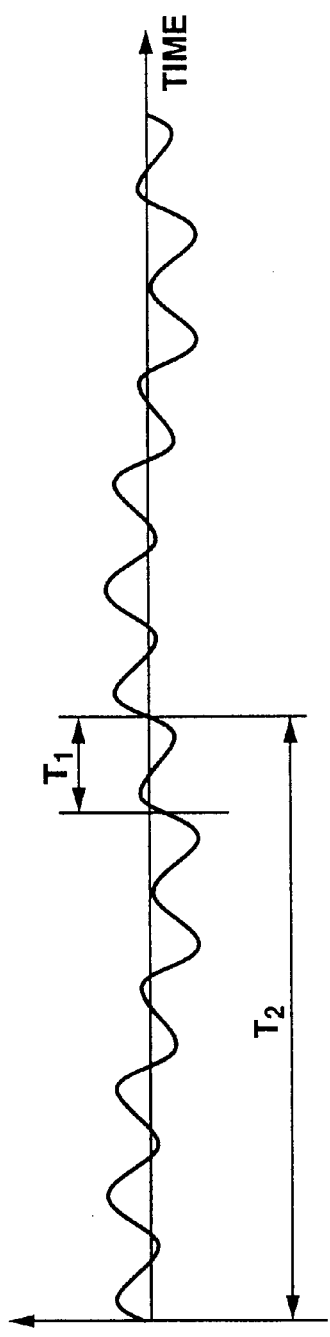
FIGS. 4A, 4B and 4C show waveforms to wobbles.
Figure 4B:
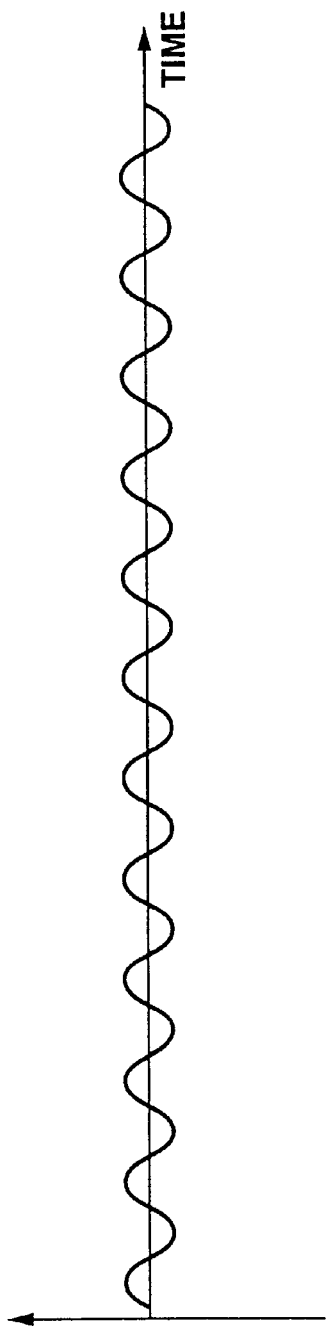

The high-pass filter 31 is supplied with a push-pull signal from the first amplifier 41. As shown in FIG. 4A, for example, the push-pull signal has a superimposed waveform of the first wavelength $T_1$ and the second wavelength $T_2$. The high-pass filter 31 filters components of the high-pass first wavelength $T_1$ and removes components of the low-pass second wavelength $T_2$ from the push-pull signal. Accordingly, as shown in FIG. 4B, an output signal from the high-pass filter 31 chiefly comprises components of the first high-pass wavelength $T_1$.

The output signal from the high-pass filter 31 is almost void of low-frequency components. However, the output signal contains a nonlinear component due to cross modulation by a cross talk from an adjacent track wobble. Especially, the high-pass filter 31 cannot completely remove cross modulation components (AM components and FM components) due to a cross talk from the adjacent wobble.

Figure 4C:
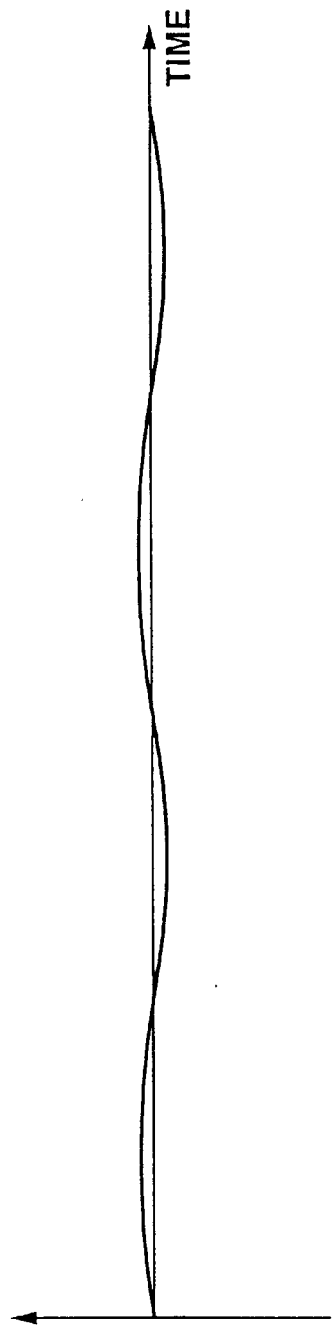

The first low-pass filter 31 is also supplied with a push-pull signal from the second amplifier 42. As shown in FIG. 4A, for example, the push-pull signal has a superimposed waveform of the first wavelength T1 and the second wavelength $T_2$. The first low-pass filter 32 filters components of the second low-pass wavelength $T_2$ and removes components of the first high-pass wavelength T1 from the push-pull signal. Accordingly, as shown in FIG. 4C, an output signal from the first low-pass filter 32 chiefly comprises components of the second low-pass wavelength $T_2$.

The second low-pass filter 33 operates similarly to the first low-pass filter 32. Description about operations of the second low-pass filter 33 is omitted.

The signal processing unit 30 contains a first delay unit 34 for delaying an output signal from the first low-pass filter 32 and a second delay unit 35 for delaying an output signal from the second low-pass filter 33. For example, each of the first delay unit 34 and the second delay unit 35 uses a delay line for adjusting a delay time.

Further, the signal processing unit 30 contains a first attenuator 36 for attenuating an output signal from the first delay unit 34 and a second attenuator 37 for attenuating an output signal from the second delay unit 35. For example, each of the first attenuator 36 and the second attenuator 37 uses a pre-set resistor for setting an attenuation.

The signal processing unit 30 also contains an adder 38 and a phase locked loop unit (PLL) 39. The adder 38 adds output signals from the high-pass filter 31, the first attenuator 36, and the second attenuator 37. The phase locked loop unit 39 generates a reference signal synchronized with a phase for an output signal from the adder 38.

The adder 38 performs an addition or subtraction for a push-pull signal from the high-pass filter 31, a push-pull signal from the first low-pass filter 32, and a push-pull signal from the second low-pass filter 33. The first delay unit 34 and first attenuator 36 adjust a phase and an amplitude of the push-pull signal from the first low-pass filter 32. The second delay unit 35 and the second attenuator 37 adjust a phase and an amplitude of the push-pull signal from the second low-pass filter 33.

The adder circuit 38 performs linear operations including addition and subtraction also for phase and amplitude adjustments in the first delay unit 34, the second delay unit 35, the first attenuator 36, and the second attenuator 37.

The first low-pass filter 32 and the second low-pass filter 33 generate signals. Performing addition or subtraction for these signals nullifies a nonlinear component contained in a signal recognized by the high-pass filter 31 as a component for the almost high-pass first wavelength $T_1$. Especially, this operation nullifies a cross modulation component due to a wobble of the adjacent track.

The recording apparatus 1 also contains a recording signal generator 45 and a laser drive unit 46. The recording signal generator 45 generates a recording signal based on a reference signal which the signal processing unit 30 outputs. The laser drive unit 46 drives a laser generator 22 based on a signal from the recording signal generator 45.

The signal processing unit 30 generates a reference signal. Using this reference signal as a time reference, the recording signal generator 45 generates a recording signal to be recorded on the optical disk 11 based on recording data such as externally supplied voice data. Specifically, the recording signal generator 45 generates a recording signal by performing modulation according to a specified modulation method such as the eight-to-fourteen modulation (EFM), the EFM plus, and the like.

The laser drive unit 46 drives the laser generator 21 in the optical head 20 based on a recording signal generated in the recording signal generator 45. When recording data on the optical disk 11, the laser drive unit 46 controls the laser generator 21 so that the laser generator 21 generates a laser beam with a specified power.

The following describes adjustments by the above-mentioned recording apparatus. The recording apparatus can optimize removal of a cross talk due to an adjacent track wobble by adjusting delay times in the first delay unit 34 and the second delay unit 35 and attenuations in the first attenuator 36 and the second attenuator 37.

The recording apparatus uses a spectrum analyzer for adjustment. The recording apparatus adjusts phases and amplitudes in output signals from the first attenuator 36 and the second attenuator 37 so that an output signal from the adder 38 will contain a minimum amount of low-pass components and a clock component distribution will be maximum. This adjustment is performed by adjusting the first delay unit 34, the second delay unit 35, the first attenuator 36, and the second attenuator 37.

This adjustment can minimize a cross talk due to an adjacent track wobble found in the output signal from the adder 38. Accordingly, a cross talk due to an adjacent track wobble is suppressed in a signal input to the PLL 39 from the adder 38. The reference signal output from the PLL 29 synchronizes with only the target track wobble, allowing output of highly accurate reference signals.

In the recording apparatus having the above-mentioned configuration, the adder 38 in the signal processing unit 30 cancels a cross talk due to a wobble of a track adjacent to the target track just by performing a linear operation for a push-pull signal. However, only such a linear operation may incompletely suppress cross talks when there is a large cross modulation component, namely great nonlinearity. The following describes a modified example which is capable of handling great nonlinearity and sufficiently suppressing cross talks.

This example provides a modified configuration of the signal processing unit 30 in the above-mentioned recording apparatus. For simplicity, the description of the modified example is limited to the signal processing unit 30. The corresponding parts are assigned the same numerals as those in FIG. 1. The description thereof is omitted.

Figure 5:
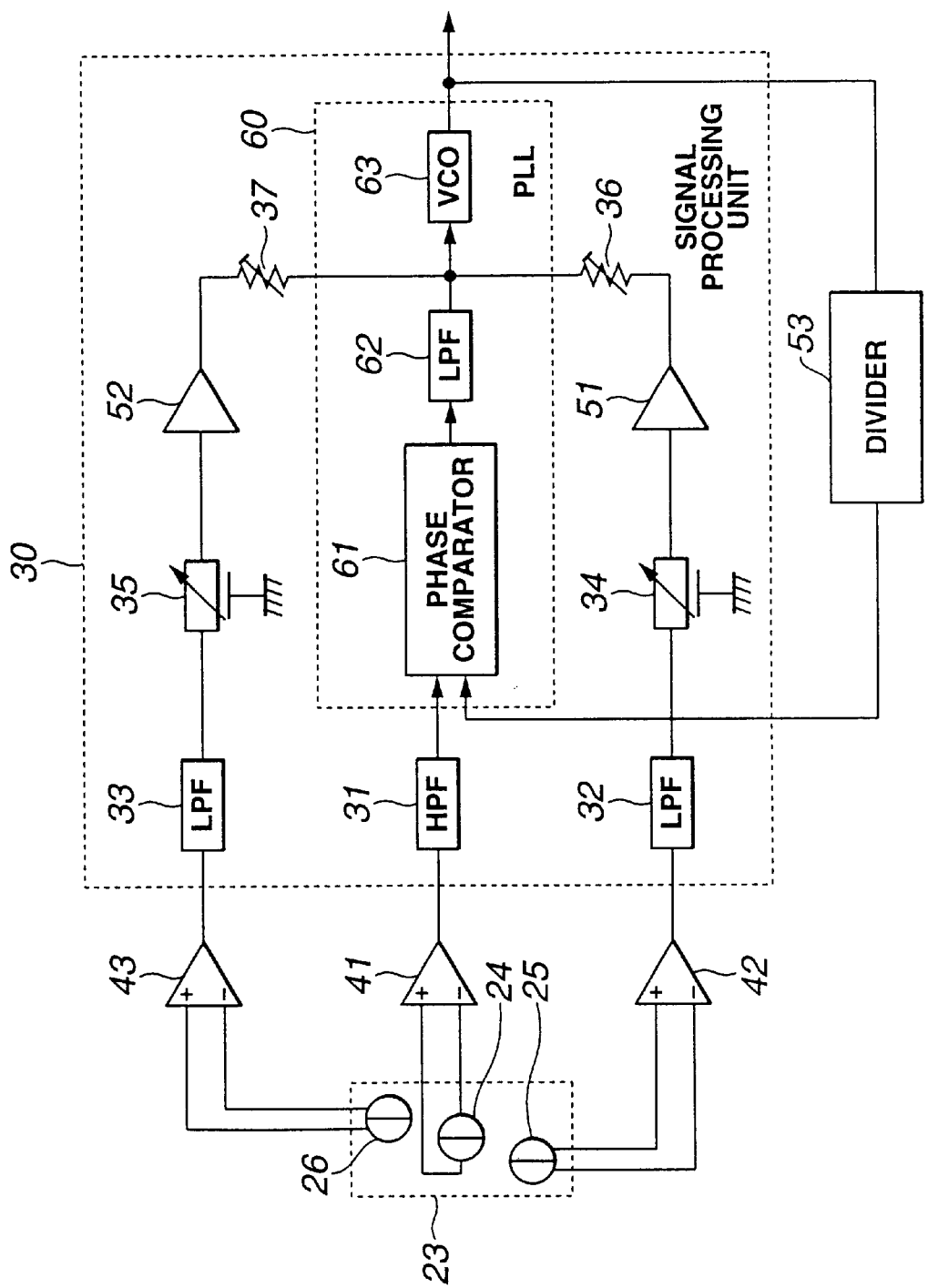
FIG. 5 is a block diagram showing a schematic configuration of a modified recording apparatus.

As shown in FIG. 5, the signal processing unit 30 in the modified example comprises the high-pass filter (HPF) 31, the first low-pass filter (LPF) 32, and the second low-pass filter (LPF) 33. The high-pass filter 31 filters a high-frequency component in an output signal from the first amplifier 41. The first low-pass filter 32 filters a low-frequency component in an output signal from the second amplifier 42. The second low-pass filter 33 filters a low-frequency component in an output signal from the third amplifier 43.

Further, the signal processing unit 30 contains a first delay unit 34 for delaying an output signal from the first low-pass filter 32 and a second delay unit 35 for delaying an output signal from the second low-pass filter 33.

In addition, the signal processing unit 30 has a fourth amplifier 51 for amplifying an output signal from the first delay unit 34 and a fifth amplifier 52 for amplifying an output signal from the second delay unit 35.

Furthermore, the signal processing unit 30 contains the first attenuator 36 for attenuating an output signal from the first amplifier 51 and the second attenuator 37 for attenuating an output signal from the second amplifier 52.

Moreover, the signal processing unit 30 comprises a PLL 60 and a divider 53. The PLL 60 generates a reference signal (clock) based on a phase in an output signal from the high-pass filter 31. The divider 53 divides a reference signal output from the PLL 60 and inputs it to the PLL 60.

Unlike the above-mentioned recording apparatus configuration, this modified example directly inputs an output signal from the high-pass filter 31 to the PLL 60. An output signal is transmitted from the first low-pass filter 32 via the first delay unit 34, the fourth amplifier 51, and the first attenuator 36. Besides, an output signal is transmitted from the second low-pass filter 33 via the second delay unit 35, the fifth amplifier 52, and the second attenuator 37. These output signals are both input to the PLL 60.

The PLL 60 comprises a phase comparator 61 and a third low-pass filter 62. The phase comparator 61 compares an output signal from the high-pass filter 31 with an output signal from the divider 53. The third low-pass filter 62 filters a low-frequency component in an output signal from the phase comparator 61.

Further, the PLL 60 contains a voltage controlled oscillator (VCO) 63. It generates a reference signal with a frequency corresponding to a combined voltage for an output signal from the third low-pass filter 62, an output signal from the first low-pass filter 32, and an output signal from the second low-pass filter 33. The output signal from the first low-pass filter 32 is transmitted via the first delay unit 34, the fourth amplifier 51, and the first attenuator 36. The output signal from the second low-pass filter 33 is transmitted via the second delay unit 35, the fifth amplifier 52, and the second attenuator 37. Each of the fourth amplifier 51 and the fifth amplifier 52 provides a variable amplification factor.

The first low-pass filter 32 provides a low-pass component in a wobble signal for an inner track adjacent to the target track. The second low-pass filter 33 provides a low-pass component in a wobble signal for an outer track adjacent to the target track. These signals supplementally control the voltage controlled oscillator 63 via the first delay unit 34, the fourth amplifier 51, and the first attenuator 36, and via the second delay unit 35, the fifth amplifier 52, and the second attenuator 37.

If the voltage controlled oscillator 63 is accelerated or decelerated due to a cross talk component from the adjacent track, it can be reversely accelerated or decelerated. Accordingly, a cross modulation component is canceled and is removed from a high-frequency wobble component in the target track which is cross-modulated in the phase direction by a cross talk due to the adjacent track wobble.

Because the voltage controlled oscillator 63 is supplied with output signals from the first low-pass filter 32 and the second low-pass filter 33, it is possible to suppress a cross talk even with large nonlinearity.

The following describes adjustments by the above-mentioned modified example of the recording apparatus. It is possible to optimize removal of a cross talk due to an adjacent track wobble by adjusting delay times in the first delay unit 34 and the second delay unit 35 and by adjusting attenuations in the first attenuator 36 and the second attenuator 37.

Specifically, a time interval analyzer is used for measuring a reference signal which is output from the PLL 60 in the signal processing unit 30. Then, action should be taken to set constants for the first delay unit 34, the second delay unit 35, the first attenuator 36, and the second attenuator 37 so as to minimize a reference signal jitter.

The above-mentioned embodiments use a phase-change for the optical disk 11. The present invention is not limited to the above-mentioned embodiments. It is possible to use other types of disks for the optical disk 11.

What is claimed is:

1. A recording apparatus for recording data on a disk-shaped recording medium whose signal recording surface is provided with a land and a groove as a recording track, in which a wobble is formed between the land and the groove, and has a superimposed waveform of a first frequency waveform and a second frequency waveform which is lower than first frequency, the recording apparatus comprising:

drive means for rotatively driving the recording medium;

light irradiation means for condensing and irradiating a laser beam onto a target track and both tracks adjacent to the target track on a signal recording surface of the recording medium rotatively driven by the drive means;

light detection means for detecting a return light from each of the target track and both tracks adjacent to the target track and converting the return light to an electric signal;

high-pass filtering means for filtering a high-frequency component in a signal corresponding to a return light output by the light detection means from the target track;

low-pass filtering means for filtering a low-frequency component in a signal corresponding to a return light output by the light detection means from each of the both tracks adjacent to the target track;

arithmetic means for computing a signal passing the high-pass filtering means and a signal passing the low-pass filtering means, the arithmetic means nullifying a nonlinear component due to wobbles of both tracks adjacent to the target track and extracting the first frequency waveform component; and means for generating a reference signal based on a phase of a signal computed by the arithmetic means.

2. The recording apparatus according to claim 1, wherein the light detection means uses a pair of light detecting elements for detecting return lights from the target track and both tracks adjacent to the target track, and a difference signal from the pair of light detecting elements is input to the high-pass filtering means and the low-pass filtering means.

3. The recording apparatus according to claim 1, wherein the high-pass filtering means filters a high-pass component containing the first frequency, and the low-pass filtering means filters a low-pass component containing the second frequency.

4. The recording apparatus according to claim 1, the apparatus further comprising:

attenuation means for attenuating signals passing the high-pass filtering means and the low-pass filtering means by varying an attenuation factor; and delay means for delaying signals passing the high-pass filtering means and the low-pass filtering means by varying a delay time, and wherein the arithmetic means is optimized by the attenuation means and the delay means.

5. The recording apparatus according to claim 1, wherein the reference signal generation means controls a voltage controlled oscillator based on phase information resulting from wobbles of tracks adjacent to the target track, and these wobbles are detected from signals each passing the low-pass filtering means.

6. A recording apparatus for recording data on a disk-shaped recording medium whose signal recording surface is provided with a land and a groove as a recording track, in which a wobble is formed between the land and the groove, has a superimposed waveform of a first frequency waveform and a second frequency waveform which is lower than the first frequency and is identified to be high-pass, the recording apparatus comprising:

a drive means for rotatively driving the recording medium;

light irradiation means for condensing and irradiating a laser beam onto a target track and both tracks adjacent to the target track on a signal recording surface of the recording medium rotatively driven by the drive means;

light detection means for detecting a return light from each of the target track and both tracks adjacent to the target track and converting the return light to an electric signal;

high-pass filtering means for filtering a high-frequency component in a signal corresponding to a return light output by the light detection means from the target track;

low-pass filtering means for filtering a low-frequency component in a signal corresponding to a return light output by the light detection means from each of the both tracks adjacent to the target track;

reference signal generation means for generating a reference signal based on a phase of a signal passing the high-pass filtering means and for having a voltage controlled oscillator which is controlled according to phase information resulting from wobbles of tracks adjacent to the target track, these wobbles being detected from signals each passing the low-pass filtering means; and dividing means for dividing a reference signal output from the reference signal generation means and for inputting this signal to the reference signal generation means.

7. The recording apparatus according to claim 6, wherein the light detection means uses a pair of light detecting elements for detecting return lights from the target track and both tracks adjacent to the target track, and difference signals from the pair of light detecting elements are input to the high-pass filtering means and the low-pass filtering means.

8. The recording apparatus according to claim 6, wherein the high-pass filtering means passes a high-pass component containing the first frequency, and the low-pass filtering means passes a low-pass component containing the second frequency.

* * * * *

UNITED STATES PATENT AND TRADEMARK OFFICE
CERTIFICATE OF CORRECTION

PATENT NO.    : 6,614,745 B1
DATED         : September 2, 2003
INVENTOR(S)   : Toru Takeda et al.

It is certified that error appears in the above-identified patent and that said Letters Patent is hereby corrected as shown below:

Column 2,
Line 51, change "waveforms" to -- waveforms due to wobbles --;
Line 52, change "to" to -- due to --.

Signed and Sealed this

Fifteenth Day of June, 2004

JON W. DUDAS
*Acting Director of the United States Patent and Trademark Office*